(12) United States Patent
Haseltine et al.

(10) Patent No.: US 11,048,099 B2
(45) Date of Patent: Jun. 29, 2021

(54) COMMUNICATION SYSTEM GENERATING A FLOATING IMAGE OF A REMOTE VENUE

(71) Applicant: Disney Enterprises, Inc., Burbank, CA (US)

(72) Inventors: Eric C. Haseltine, Burbank, CA (US); Clifford Wong, Burbank, CA (US); Nathan Nocon, Valencia, CA (US); Michael P. Goslin, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/197,198

(22) Filed: Nov. 20, 2018

(65) Prior Publication Data

US 2020/0159035 A1 May 21, 2020

(51) Int. Cl.
*H04N 13/302* (2018.01)
*G02B 30/56* (2020.01)
(Continued)

(52) U.S. Cl.
CPC ............ *G02B 30/56* (2020.01); *G02B 30/54* (2020.01); *H04N 13/302* (2018.05); *H04N 13/351* (2018.05); *H04N 13/398* (2018.05)

(58) Field of Classification Search
CPC ...... G02B 30/56; G02B 30/54; H04N 13/351; H04N 13/398; H04N 13/302;
(Continued)

(56) References Cited

U.S. PATENT DOCUMENTS

| 4,687,167 A | 8/1987 | Skalka et al. |
| 4,943,851 A | 7/1990 | Lang |

(Continued)

FOREIGN PATENT DOCUMENTS

| JP | S58-154913 U | 10/1983 |
| JP | H1-280992 A | 11/1989 |

(Continued)

OTHER PUBLICATIONS

Horimai, Hideyoshi, et al. "Full-Color 3D Display System with 360 Degree Horizontal Viewing Angle." *Proc. Int. Symposium of 3D and Contents*, 2010. pp. 1-4.
(Continued)

*Primary Examiner* — Roberto W Flores
(74) *Attorney, Agent, or Firm* — Farjami & Farjami LLP

(57) ABSTRACT

According to one implementation, a communication system includes a computing platform having one or more hardware processor(s) and a system memory storing a software code, as well as an image capture device, a transceiver, and a display including one or more display screen(s) controlled by the hardware processor(s). The communication system also includes a base including a motor coupled to a rotor for rotating the display. The hardware processor(s) is/are configured to execute the software code to receive audio-visual data including image data corresponding to a remote venue and render the image data on the display screen(s) while spinning the display to generate a floating image of the remote venue. The hardware processor(s) is/are further configured to execute the software code to, concurrently with spinning the display, obtain local image data of a local venue and transmit local audio-visual data including the local image data to the remote venue.

20 Claims, 9 Drawing Sheets

(51) Int. Cl.
*H04N 13/398* (2018.01)
*H04N 13/351* (2018.01)
*G02B 30/54* (2020.01)

(58) Field of Classification Search
CPC .. H04N 13/275; H04N 13/363; H04N 13/393; G06F 3/011; G09G 3/00–005
See application file for complete search history.

(56) References Cited

U.S. PATENT DOCUMENTS

| | | | |
|---|---|---|---|
| 5,057,827 | A | 10/1991 | Nobile |
| 5,148,310 | A | 9/1992 | Batchko |
| 5,239,892 | A | 8/1993 | Sakai |
| 5,437,235 | A | 8/1995 | Randolph |
| 5,714,997 | A | 2/1998 | Anderson |
| 5,815,314 | A | 9/1998 | Sudo |
| 6,115,006 | A | 9/2000 | Brotz |
| 6,183,088 | B1 | 2/2001 | LoRe |
| 6,208,318 | B1 | 3/2001 | Anderson |
| 6,481,851 | B1 | 11/2002 | McNelley |
| 6,801,185 | B2 | 10/2004 | Salley |
| 6,886,281 | B2 | 5/2005 | Smith |
| 7,002,604 | B1 | 2/2006 | Barrus |
| 7,477,252 | B2 | 1/2009 | Chun |
| 7,490,941 | B2 | 2/2009 | Mintz |
| 7,587,120 | B2 | 9/2009 | Koo |
| 7,708,640 | B2 | 5/2010 | Burak |
| 8,233,032 | B2 | 7/2012 | Yukich |
| 8,698,966 | B2 | 4/2014 | Liu |
| 9,053,660 | B2 | 6/2015 | Liu |
| 9,186,595 | B1 | 11/2015 | Cannon |
| 10,310,284 | B1 | 6/2019 | Waldron |
| 2002/0148148 | A1 | 10/2002 | Smith |
| 2003/0142067 | A1* | 7/2003 | Kurtenbach ....... G02B 27/2271 345/156 |
| 2004/0082283 | A1 | 4/2004 | Lindell et al. |
| 2004/0196362 | A1* | 10/2004 | Hoshino ................ G03B 37/04 348/51 |
| 2005/0035962 | A1 | 2/2005 | Ishibashi et al. |
| 2005/0083570 | A1 | 4/2005 | Ueda et al. |
| 2005/0284997 | A1 | 12/2005 | Tisbo |
| 2006/0171008 | A1* | 8/2006 | Mintz .................... G02B 30/54 359/15 |
| 2007/0139769 | A1 | 6/2007 | DeCusatis et al. |
| 2007/0293299 | A1 | 12/2007 | Aida |
| 2008/0218854 | A1* | 9/2008 | Hoshino ................ G02B 30/35 359/462 |
| 2009/0312979 | A1 | 12/2009 | Pan |
| 2010/0007582 | A1* | 1/2010 | Zalewski ................ A63F 13/00 345/8 |
| 2011/0199373 | A1 | 8/2011 | Liu et al. |
| 2012/0146897 | A1* | 6/2012 | Yoshida ................ H04N 13/39 345/156 |
| 2012/0194419 | A1 | 8/2012 | Osterhout |
| 2012/0293941 | A1 | 11/2012 | Myerchin |
| 2013/0050198 | A1 | 2/2013 | Song |
| 2013/0100126 | A1 | 4/2013 | Kim et al. |
| 2013/0100358 | A1 | 4/2013 | De Collibus |
| 2013/0092805 | A1 | 8/2013 | Funk et al. |
| 2013/0343743 | A1 | 12/2013 | Yen |
| 2014/0091942 | A1 | 4/2014 | Matloff et al. |
| 2014/0118271 | A1 | 5/2014 | Lee |
| 2014/0307068 | A1 | 10/2014 | Song et al. |
| 2015/0193084 | A1 | 7/2015 | Juni |
| 2015/0212718 | A1 | 7/2015 | Kellhammer |
| 2015/0288857 | A1 | 10/2015 | Fay et al. |
| 2017/0009935 | A1 | 1/2017 | Theis et al. |
| 2017/0023911 | A1 | 1/2017 | Russell et al. |
| 2017/0038829 | A1* | 2/2017 | Lanier .................. H04L 65/403 |
| 2017/0115488 | A1 | 4/2017 | Ambrus |
| 2017/0140791 | A1* | 5/2017 | Das ......................... G06T 7/13 |
| 2017/0343804 | A1 | 11/2017 | Choi |
| 2018/0024373 | A1 | 1/2018 | Joseph |
| 2018/0224678 | A1 | 8/2018 | Jung |
| 2019/0156710 | A1 | 5/2019 | Hanson |

FOREIGN PATENT DOCUMENTS

| | | |
|---|---|---|
| JP | H9-238369 A | 9/1997 |
| JP | 2004-54150 A | 2/2004 |
| JP | 2005-221946 A | 8/2005 |
| JP | 2005-275398 A | 9/2005 |
| JP | 2010-273013 A | 12/2010 |

OTHER PUBLICATIONS

File History of Related U.S. Appl. No. 15/888,896, filed Feb. 5, 2018, and titled "Floating Image Display System".

File History of Related U.S. Appl. No. 15/985,477, filed May 21, 2018, and titled "Electrical Charger for a Spinning Device".

File History of Related U.S. Appl. No. 15/985,502, filed May 21, 2018, and titled "Display of a Floating Image With Depth Enhancement".

File History of Related U.S. Appl. No. 15/983,006, filed May 17, 2018, and titled "Multi-Perspective Display of an Image".

File History of Related U.S. Appl. No. 16/011,505, filed Jun. 18, 2018, and titled "Image Display System With Visual Filter".

File History of Related U.S. Appl. No. 16/002,947, filed Jun. 7, 2018, and titled "Image Generation System Including a Spinning Display".

Yasuhiro Suzuk, et al. "Research of Real World Life-Sized Video Avatar Presentation System," *Proceedings of the Virtual Reality Society of Japan Annual Conference 10*, Sep. 29, 2005, pp. 111-114.

Hikechi Maeda, et al. "Experimental Development and Evaluation of All-Around Display System for Video Avatar in the Real World," *Proceedings of the Virtual Reality Society of Japan Annual Conference 8*, Sep. 3, 2003.

\* cited by examiner

120
COMMUNICATION SYSTEM GENERATING A FLOATING IMAGE OF A REMOTE VENUE

BACKGROUND

The display screens with which many modern communication devices are equipped are typically designed to display a two-dimensional (2D) image from a single viewing perspective. As a result, and despite their ability to display sharp, richly featured, high definition images, interactive group communications such as video conferencing using those devices tend to be less engaging and immersive than if the participants could be provided with the illusion of being together in person.

One conceivable improvement to the conventional approach to providing 2D images is to render group communications using 3D imagery. However, several significant obstacles to wider use of 3D imagery exist. For example, in order to project a 3D image, multiple projectors, augmented reality (AR) headgear, and/or other complex display technology is typically required to create the illusion of a real-world 3D image. Additional complications can arise if the 3D image is to be viewed from multiple perspectives.

SUMMARY

There are provided communication systems and methods for generating a floating image of a remote venue, substantially as shown in and/or described in connection with at least one of the figures, and as set forth more completely in the claims.

DETAILED DESCRIPTION

Figure 1A:
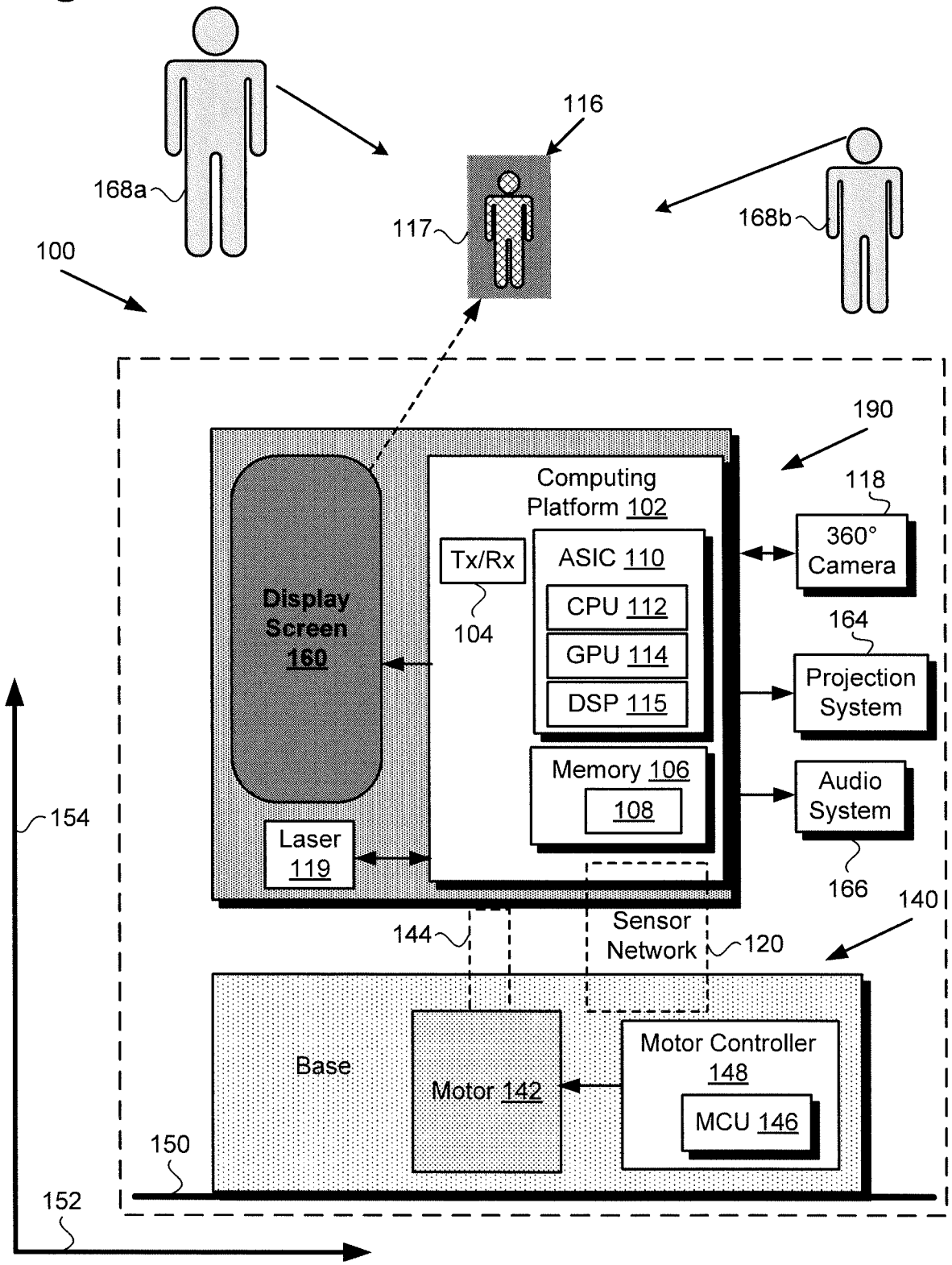
FIG. 1A shows a diagram of an exemplary communication system for generating a floating image of a remote venue, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A shows a diagram of exemplary communication system 100 for generating a floating image of a remote venue, according to one implementation. As shown in FIG. 1A, communication system 100 includes display 190 configured to rotate, coupled to stationary base 140 by rotor 144. Display 190 includes display screen 160 and computing platform 102 communicatively coupled to display screen 160, as well as to projection system 164, audio system 166, optional 360° degree camera 118, and laser 119.

As further shown in FIG. 1A, computing platform 102 includes transceiver 104, application specific integrated circuit (ASIC) 110 including central processing unit (CPU) 112 implemented as a hardware processor, graphics processing unit (GPU) 114, and may further include digital signal processor (DSP) 115. Computing platform 102 also includes system memory 106 implemented as a non-transitory storage device storing software code 108.

According to the exemplary implementation shown in FIG. 1A, base 140 includes motor 142 for rotating rotor 144 and display 190, and motor controller circuit 148 including motor control unit (MCU) 146. Base 140 is situated on surface 150, which may be a floor or any other substantially horizontal surface. In addition, FIG. 1A shows horizontal axis 152 substantially parallel to surface 150, and vertical axis 154 substantially perpendicular to surface 150. Also shown in FIG. 1A are sensor network 120 bridging base 140 and display 190, floating image 116 of remote venue 117 generated by communication system 100, and local viewers 168a and 168b of floating image 116. It is noted that the combination of computing platform 102 of display 190, sensor network 120, and motor controller circuit 148 of base 140 enable the necessary time synchronization between the revolutions per second (rps) of motor 142 and rotor 144, and the frame rate in frames per second (fps) at which display screen 160 renders images.

It is further noted that, as used in the present application, the terms "central processing unit" or "CPU" and "graphics processing unit" or "GPU" have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 108, from system memory 106. A GPU is configured to reduce the processing overhead of the CPU by performing computationally intensive graphics processing tasks.

In addition, for the purposes of the present application, the term "perspective" refers to the particular viewing angle from which an object, virtual object, or image is viewed by an observer. Referring to FIG. 1A, for example, a perspective of floating image 116 of remote venue 117 refers to the viewing angle of an observer of floating image 116 of remote venue 117 with respect to a circle substantially concentric with rotor 144 of communication system 100, in a plane substantially perpendicular to vertical axis 154.

Moreover, the terms "render" and "rendering" are defined to mean causing one or more images to appear on a display screen, such as display screen 160 for example. Thus, rendering an image may mean causing an entirely new image to appear on the display screen, or refreshing an image previously appearing on the display screen. With respect to the term "privacy filter," as used in the present application, privacy filter refers to a film or a structure, such as a louvered structure, affixed to a display screen so as to prevent viewing of the display screen outside of a predetermined viewing angle.

It is also noted that although FIG. 1A shows two local users 168a and 168b, that representation is provided merely for conceptual clarity. More generally, local users 168a and 168b may correspond to a single user, or to more or many more than two users located in a venue local to and including communication system 100.

Local users 168a and 168b may be positioned so as to view floating image 116 of remote venue 117 from a variety of perspectives. For example, in some implementations, users 168a and 168b may be situated so as to view floating image 116 of remote venue 117 from a number of discrete perspectives, such as three discrete perspectives located approximately 120° apart on an imaginary 360° circle surrounding floating image 116. However, in other implementations, users 168a and 168b may be able to view floating image 116 of remote venue 117 from the perspective of any position on such an imaginary circle surrounding floating image 116 of remote venue 117.

In some implementations, one or more of local users 168a and 168b may be interactively engaged with the remote venue depicted by floating image 116 via communication system 100 including computing platform 102, 360° camera 118, projection system 164, audio system 166, sensor network 120, and display screen 160. That is to say, in those implementations, CPU 112 of ASIC 110 may be configured to execute software code 108 to utilize transceiver 104, projection system 164, audio system 166, sensor network 120, GPU 114, and display screen 160 to generate and sustain floating image 116 of remote venue 117 during communications with remote venue 117.

Although FIG. 1A depicts projection system 164 and audio system 166 as communicatively coupled to, but not structurally integrated with, display 190, that representation is merely exemplary. In other implementations, one or both of projection system 164 and audio system 166 may be structurally integrated with display 190. Thus, in various implementations, display 190 can include one or more of projection system 164 and audio system 166, in addition to computing platform 102 and display screen 160.

Projection system 164 may include image projection components that are wholly integrated with display 190, may include image projection components controlled by but remote from display 190, or may be partially integrated with display 190 while including remote image projection components. Projection system 164 may include multiple projection sources, and may be configured to provide projection lighting of varying intensity and varying colors, for example.

Analogously, audio system 166 may be wholly integrated with display 190, may include elements, such as audio speakers, controlled by but remote from display 190, or may be partially integrated with display 190 while including remote audio elements. In one implementation, audio system 166 may include a theater quality Dolby® high definition (HD) surround-sound system, for example.

According to the exemplary implementation shown in FIG. 1A, communication system 100 includes an image capture device in the form of 360° camera 118 communicatively coupled to computing platform 102. It is noted that, in some implementations, 360° camera 118 may be communicatively coupled to, but not structurally integrated with, other components of communication system 100. For example, 360° camera 118 may be strategically situated in a venue local to communication system 100 to capture images of the local venue, as well as gestures and/or facial expressions by local users 168a and 168b. Alternatively, in some implementations, 360° camera 118 may be mounted on or otherwise integrated with stationary base 140. In various implementations, 360° camera 118 may be in wireless communication with computing platform 102 and may be wirelessly controlled by CPU 112.

As further shown in FIG. 1A, in some implementations, communication system 100 may further include an image capture device including laser 119 communicatively coupled to computing platform 102 and configured to rotate with display 190. Laser 119 may be controlled by CPU 112 and may be implemented in conjunction with a laser sensor included in sensor network 120 (laser sensor not shown in FIG. 1A) to function as a Lidar type probe for mapping the venue local to communication system 100 and/or determining the locations of local users 168a and 168b within that local venue.

Transceiver 104 may be implemented as a wireless communication unit controlled by CPU 112 and enabling communication system 100 to exchange data with remote venue 117. For example, transceiver 104 may be implemented to support communication via WiFi, may take the form of a 3G or 4G wireless transceiver, or may be a 5G wireless transceiver configured to satisfy the IMT-2020 requirements established by the International Telecommunication Union (ITU).

It is noted that sensor network 120 is described in greater detail below by reference to FIGS. 1B and 1C, while various implementations of display 190 including display screen 160 are described below by reference to FIGS. 2A, 2B, 3, 4, and 5.

Figure 1B:
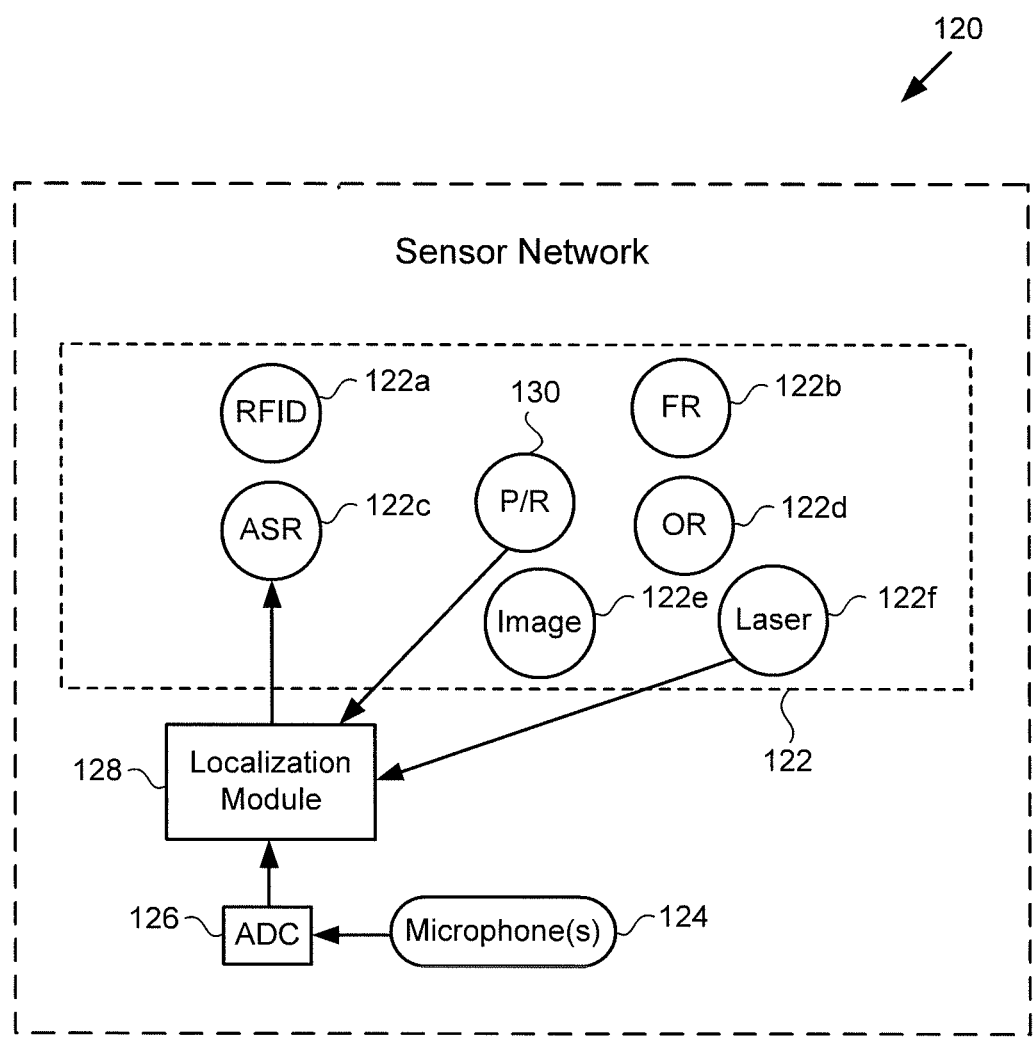
FIG. 1B shows a diagram of an exemplary sensor network suitable for use as part of the communication system of FIG. 1A, according to one implementation.

FIG. 1B shows a more detailed exemplary implementation of sensor network 120, in FIG. 1A. As shown in FIG. 1B, sensor network 120 includes multiple sensors 122 controlled by CPU 112 of computing platform 102. According to the exemplary implementation shown in FIG. 1B, sensors 122 include one or more microphone(s) 124, analog-to-digital converter (ADC) 126, and localization module 128. As further shown in FIG. 1B, sensors 122 of sensor network 120 may include radio-frequency identification (RFID) sensor 122a, facial recognition (FR) sensor 122b, automatic speech recognition (ASR) sensor 122c, object recognition (OR) sensor 122d, image sensor 122e, laser sensor 122f, and one or more position and/or rate (P/R) sensor(s) 130.

It is noted that the specific sensors shown to be included among sensors 122 of sensor network 120 are merely exemplary, and in other implementations, sensors 122 of sensor network 120 may include more, or fewer, sensors than RFID sensor 122a, FR sensor 122b, ASR sensor 122c, OR sensor 122d, image sensor 122e, laser sensor 122f, and P/R sensor(s) 130. RFID sensor 122a, FR sensor 122b, ASR sensor 122c, OR sensor 122d, image sensor 122e, laser sensor 122f, and P/R sensor(s) 130 may be implemented using any suitable sensors for those respective functions, as known in the art. Microphone(s) 124 may include one or more stationary and/or moving microphone(s). For example, stationary microphone(s) of microphone(s) 124 may be distributed in a 360° array surrounding base 140 to enhance directional sensing of sound, such as speech, produced by one or more of local users 168a and 168b.

In some implementations, one or more moving microphone(s) of microphone(s) 124 may rotate in synchronization with rotor 144 for display 190. In those implementations, P/R sensor(s) 130 may be used in combination with microphone(s) 124 to identify the direction from which a sound sensed using microphone(s) 124 is received.

Image sensor 122*e* may correspond to one or more sensors for obtaining visual images of local users 168*a* and 168*b*, as well as the local venue in which communication system 100 and local users 168*a* and 168*b* are located. Image sensor 122*e* may implemented as one or more stationary and/or rotating video cameras, for example, or as a vertical array of image capture pixels controlled by a physical or global electronic shutter and configured to rotate with display 190.

As indicated in FIG. 1B, in some implementations, data from P/R sensor(s) 130, and/or data from laser sensor 122*f*, and/or data generated by ADC 126 from sounds detected by microphone(s) 124 may be processed by localization module 128 to identify the distance and/or direction of the respective sources of the sounds received by microphone(s) 124, such as local users 168*a* and 168*b*. In those implementations, the output from localization module 128 may be provided to ASR sensor 122*c* to enhance the performance of ASR sensor 122*c* in discriminating among environmental sounds, noise, and purposeful speech by one or more of local users 168*a* and 168*b*.

Figure 1C:
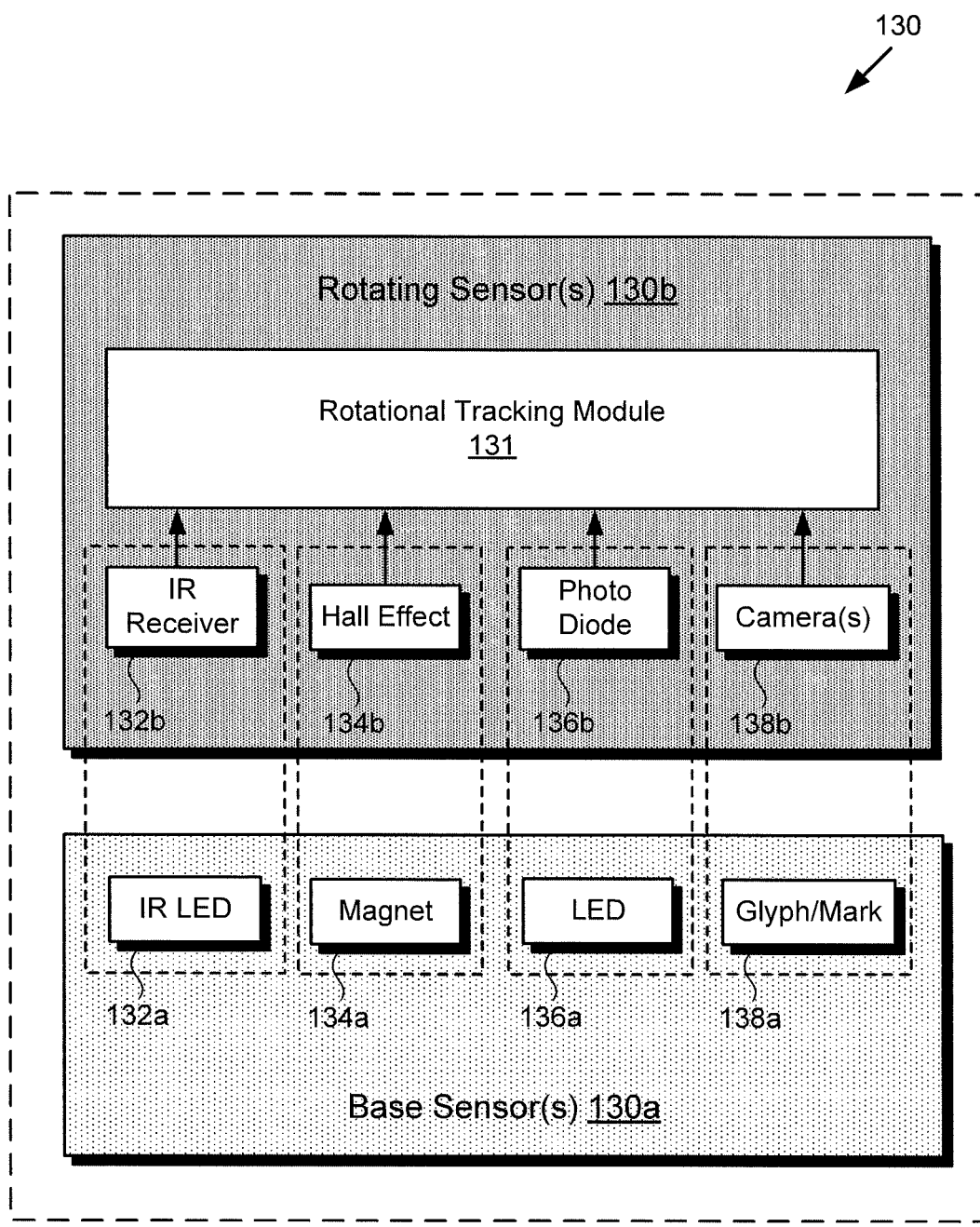
FIG. 1C shows a diagram of exemplary position and/or rate (P/R) sensors suitable for use as part of the communication system of FIG. 1A, according to one implementation.

FIG. 1C shows a more detailed exemplary implementation of P/R sensor(s) 130, in FIG. 1B. As shown in FIG. 1C, P/R sensor(s) 130 can include one or more base sensor(s) 130*a* integrated with base 140, and one or more rotating sensor(s) 130*b* integrated with display 190 and configured to rotate with display 190.

According to the exemplary implementation shown in FIG. 1C, base sensor(s) 130*a* may include one or more of infrared (IR) light-emitting diode (LED) 132*a*, magnet 134*a*, visible light LED 136*a*, and glyph or other visible marker 138*a*, to name a few examples. As further shown in FIG. 1C, rotating sensor(s) 130*b* may include one or more of IR receiver 132*b* for sensing IR LED 132*a*, Hall effect sensor 134*b* for sensing magnet 134*a*, photo diode 136*b* for sensing visible light LED 136*a*, and one or more camera(s) 138*b* for sensing glyph or visible marker 138*a*. In addition, rotating sensor(s) 130*b* are shown to be coupled to rotational tracking module 131.

It is noted that the distribution of features identified by reference numbers 132*a*, 134*a*, 136*a*, 138*a*, 132*b*, 134*b*, 136*b*, and 138*b* between base sensor(s) 130*a* and rotating sensor(s) 130*b* is merely exemplary. In another implementation, for example, the positions of features 132*a*, 134*a*, 136*a*, 138*a*, 132*b*, 134*b*, 136*b*, and 138*b* may be reversed. That is to say, one or more of IR LED 132*a*, magnet 134*a*, visible light LED 136*a*, and glyph or visible marker 138*a* may be included as rotating sensor(s) 130*b*, while one or more of IR receiver 132*b*, Hall effect sensor 134*b*, photo diode 136*b*, and camera(s) 138*b* may be included as base sensor(s) 130*a*. It is further noted that camera(s) 138*b* may include one or more still camera(s) and/or one or more video camera(s), for example.

As indicated in FIG. 1C, in some implementations, data from one or more of IR receiver 132*b*, Hall effect sensor 134*b*, photo diode 136*b*, and camera 138*b* is processed by rotational tracking module 131 to identify the rotational position of display screen 160 being tracked by P/R sensor(s) 130 at any point in time. In those implementations, the output from rotational tracking module 131 may be provided to software code 108 to enhance the performance of communication system 100 in rendering floating image 116 of remote venue 117, or in capturing image data of the venue local to communication system 100 for transmission to remote venue 117.

Figure 2A:
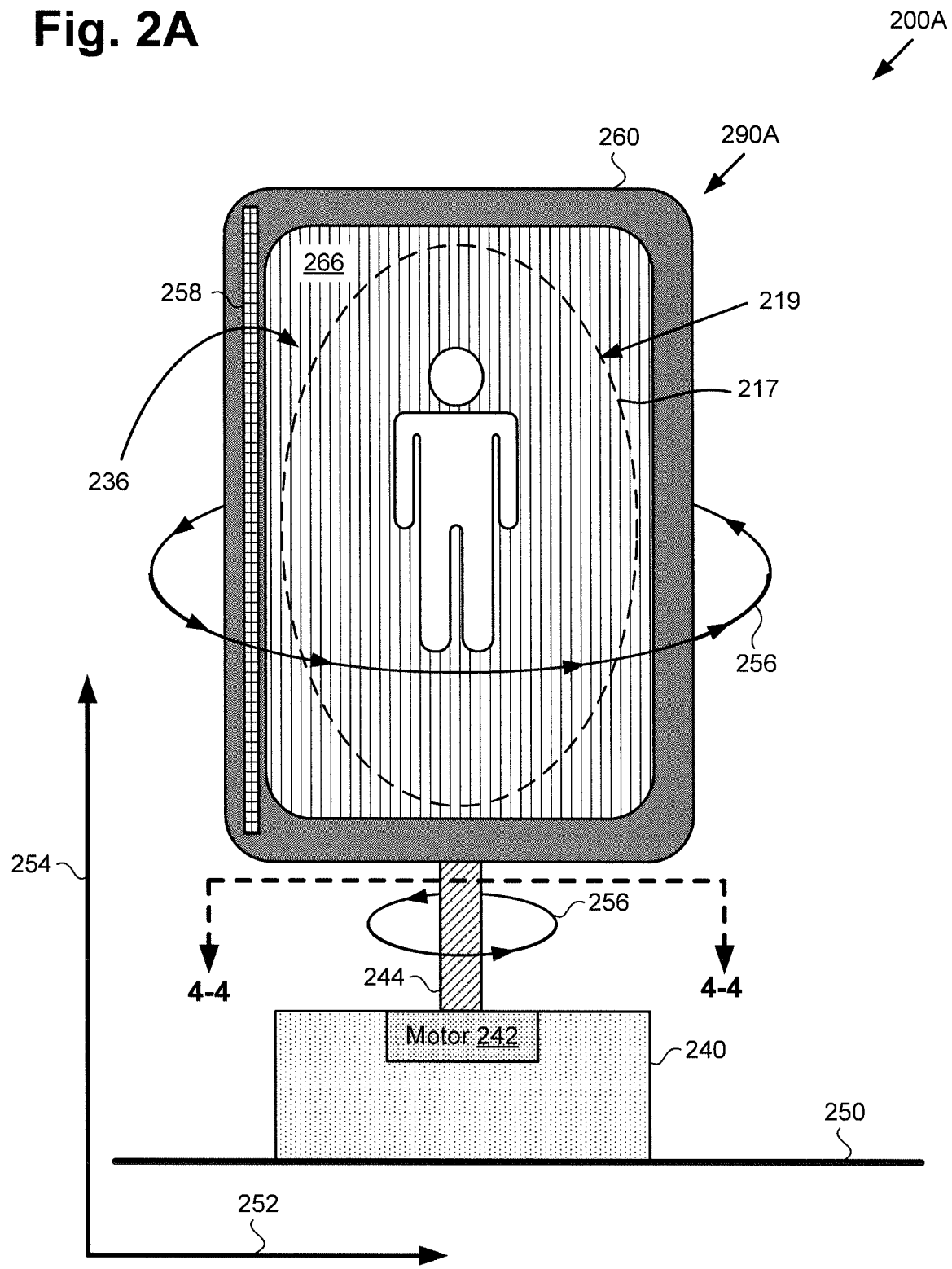
FIG. 2A shows a diagram of an exemplary communication system for generating a floating image of a remote venue, according to another implementation.

FIG. 2A shows a diagram of exemplary communication system 200A for generating a floating image of a remote venue, according to another implementation. As shown in FIG. 2A, communication system 200A includes base 240 and display 290A. Base 240 is shown to include motor 242, and to be situated on surface 250, which may be a floor or any other substantially horizontal surface. In addition, according to the exemplary implementation shown in FIG. 2A, communication system 200A includes rotor 244 coupling base 240 to display 290A.

Display 290A includes image capture device 258 mounted on display 290A and configured to rotate with display 290A, as well as display screen 260 having optional privacy filter 266 affixed to display surface 236 of display screen 260. In addition, FIG. 2A shows two-dimensional (2D) image 219 of remote venue 217 rendered on display screen 260. Also shown in FIG. 2A are horizontal axis 252 substantially parallel to surface 250, vertical axis 254 substantially perpendicular to surface 250, spin direction 256 of rotor 244 and display screen 260, and perspective lines 4-4.

Communication system 200A corresponds in general to communication system 100, in FIG. 1A. As a result, communication system 200A may share any of the characteristics attributed to communication system 100 by the present disclosure, and vice versa. For example, like communication system 100, communication system 200A includes sensor network 120 bridging base 240 and display 290A. In addition, rotor 244, base 240, and motor 242, correspond in general to rotor 144, base 140, and motor 142, in FIG. 1A. Thus, rotor 244, base 240, and motor 242 may share any of the characteristics attributed to rotor 144, base 140, and motor 142 by the present disclosure, and vice versa. That is to say, although not explicitly shown in FIG. 2A, base 240 includes features corresponding respectively to motor controller circuit 148 and MCU 146.

Moreover, display 290A including display screen 260 corresponds in general to display 190 including display screen 160, in FIG. 1A. Thus, display 290A may share any of the characteristics attributed to display 190 by the present disclosure, and vice versa. In other words, although not explicitly shown in FIG. 2A, display 290A includes features corresponding respectively to computing platform 102 including transceiver 104, ASIC 110 having CPU 112, GPU 114, and DSP 116, and system memory 106 storing software code 108. In addition, computing platform 102 of display 290A may be communicatively coupled to one or more of projection system 164, audio system 166, 360° degree camera 118, and laser 119. Furthermore, like display 290A, display 190 may include image capture device 258 mounted on display 190 and configured to rotate with display 190.

Referring to FIGS. 1A and 2A in combination, according to the exemplary implementation shown in FIG. 2A, display screen 160/260 may be controlled by CPU 112 and/or GPU 114 of ASIC 110, while rotor 144/244 coupled to display 190/290A is controlled by CPU 112 of ASIC 110. CPU 112 of ASIC 110 is configured to execute software code 108 to render 2D image 219 of remote venue 217 on display screen 160/260 using CPU 112 and/or GPU 114.

It is noted that remote venue 217 corresponds to remote venue 117, in FIG. 1A. Thus, according to the exemplary implementation shown in FIG. 2A, spinning of display 190/290A including display screen 160/260 on which 2D image 219 of remote venue 117/217 is rendered results in generation of floating image 116 of remote venue 117/217 by communication system 100/200A. That is to say, CPU 112 is further configured to execute software code 108 to utilize motor 142/242 to spin rotor 144/244 and display 190/290A about vertical axis 154/254 at a predetermined spin rate to generate floating image 116 of remote venue 117/217 corresponding to 2D image 219 of remote venue 117/217. As a result of the image generation performed by communication system 100/200A through spinning of display 190/290A, floating image 116 may appear to be a three-dimensional (3D) image of remote venue 117/217.

In some implementations, display screen 160/260 may be a liquid-crystal display (LCD) screen or an organic light-emitting diode (OLED) display screen, for example. Moreover, in some implementations, computing platform 102 and display 190/290A may be integrated with a mobile communication device configured to spin with rotor 144/244. For example, computing platform 102 and display 190/290A may be provided by a smartphone or a tablet computer. It is noted that although display screen 160/260 is depicted as a substantially flat display screen in FIG. 2A, that representation is merely exemplary. In various implementations, display screen 160/260 may be substantially flat, may have a convex display surface 236, and/or may be a half cylindrical or full cylindrical display screen.

In the implementations shown in FIGS. 1A and 2A, various features and/or techniques may be utilized to reduce flicker and/or blur of floating image 116 generated by display 190/290A. For example, optional privacy filter 266 may be affixed to display surface 236 of display screen 160/260 so as to restrict viewing of display screen 160/260 outside of a predetermined viewing angle. As noted above, such a privacy filter may take the form of a louvered structure affixed to display screen 160/260, or to a privacy film covering display surface 236 of display screen 160/260.

Although, in some implementations, optional privacy filter 266 may be an advantageous or desirable feature for reducing flicker and/or blur, in some other implementations it may be preferable to omit optional privacy filter 266. For example, in implementations in which true volumetric images are to be displayed as floating image 116, privacy filter 266 may be preferentially omitted.

It is noted that CPU 112 may execute software code 108 to control motor 142/242 in order to spin rotor 144/244 and display 190/290A about vertical axis 154/254 at a varying spin rate, or at a substantially constant predetermined spin rate. It is also noted that spin direction 256 may be in either a counter clockwise direction with respect to the plane of horizontal axis 152/252, as shown in FIG. 2A, or in a clockwise direction with respect to that plane.

In some implementations, CPU 112 may execute software code 108 to use GPU 114 to modify 2D image 219 as rotor 144/244 and display 190/290A rotate, so as to generate multiple perspectives of floating image 116 that are appropriate respectively to the locations of each of local users 168a and 168b in FIG. 1A. For example, local user 168a located so as to face a front side of floating image 116 and stationary at that location might consistently view floating image 116 from a frontal perspective. By contrast, local user 168b located so as to face a backside of floating image 116, i.e., 180° apart from the perspective of observer local user 168a, and stationary at that location might consistently view floating image 116 as if from the rear.

Image capture device 258 may include one or more image sensors 122e for obtaining visual images of local users 168a and 168b, as well as the local venue in which communication system 100/200A and local users 168a and 168b are situated. Image capture device 258 may implemented as one or more video cameras, for example, or as a vertical array of image capture pixels controlled by a physical or global electronic shutter and configured to rotate with display 190/290A.

Figure 2B:
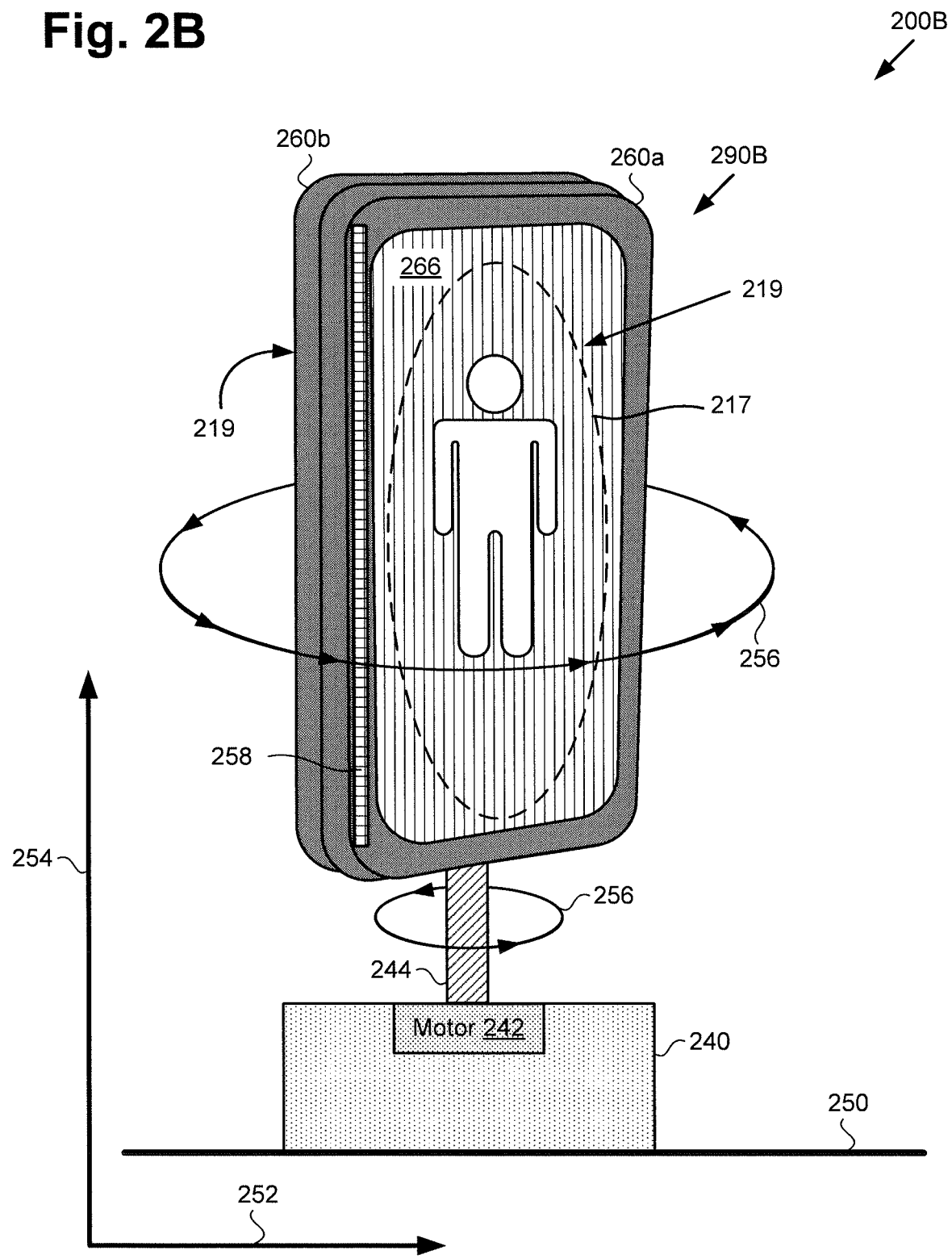
FIG. 2B shows a diagram of an exemplary communication system for generating a floating image of a remote venue, according to yet another implementation.

FIG. 2B shows a diagram of exemplary communication system 200B for generating a floating image of a remote venue, according to another implementation. It is noted that the features identified in FIG. 2B by reference numbers identical to reference numbers shown in FIG. 2A correspond respectively to those previously described features and may share any of the characteristics attributed to those corresponding features above.

Display 290B corresponds in general to display 190/290A, in FIGS. 1A and 2A. Thus, display 290B may share any of the characteristics attributed to display 190/290A by the present disclosure, and vice versa. In other words, although not explicitly shown in FIG. 2B, display 290B includes features corresponding respectively to computing platform 102 including transceiver 104, ASIC 110 having CPU 112, GPU 114, and DSP 116, and system memory 106 storing software code 108. In addition, computing platform 102 of display 290B may be communicatively coupled to one or more of projection system 164, audio system 166, 360° degree camera 118, and laser 119.

Display 290B differs from display 290A in that display 290B includes two display screens: first display screen 260a and second display screen 260b. As shown in FIG. 2B, first and second display screens 260a and 260b are situated back-to-back and are mutually coupled to rotor 244 to spin in unison at a predetermined spin rate. In addition and as further shown by FIG. 2B, each of first and second display screens 260a and 260b has 2D image 219 of remote venue 117/217 rendered thereon. Each of first and second display screens 260a and 260b corresponds in general to display screen 160/260, described above, and may share any of the characteristics attributed to that corresponding feature above.

Although each of first and second display screens 260a and 260b is shown to have 2D image 219 of remote venue 117/217 rendered thereon, in some implementations, first and second display screens 260a and 260b may show different respective perspectives of remote venue 117/217. That is to say, 2D image 219 corresponding to a first perspective of remote venue 117/217 may be rendered on first display screen 260a while a second, different, perspective of remote venue 117/217 is rendered on second display screen 260b. For example, CPU 112 may execute software code 108 to use GPU 114 to render a particular perspective of remote venue 117/217 on first display screen 260a, while substantially concurrently rendering a 180° opposite perspective of remote venue 117/217 on second display screen 260b.

The exemplary back-to-back display screen implementation shown in FIG. 2B may be used to further enable the generation of multiple perspectives of floating image 116 appropriate respectively to the location of each of local users 168a and 168b in the venue local to communication system 100/200A/200B. It is noted that the exemplary back-to-back display screen implementation shown in FIG. 2B also advantageously increases the brightness of floating image 116. It is further noted that the use of back-to-back first and second display screens 260a and 260b enables the predetermined spin rate utilized in the implementation of FIG. 2B to be approximately half that used in the implementation of FIG. 2A.

Figure 3:
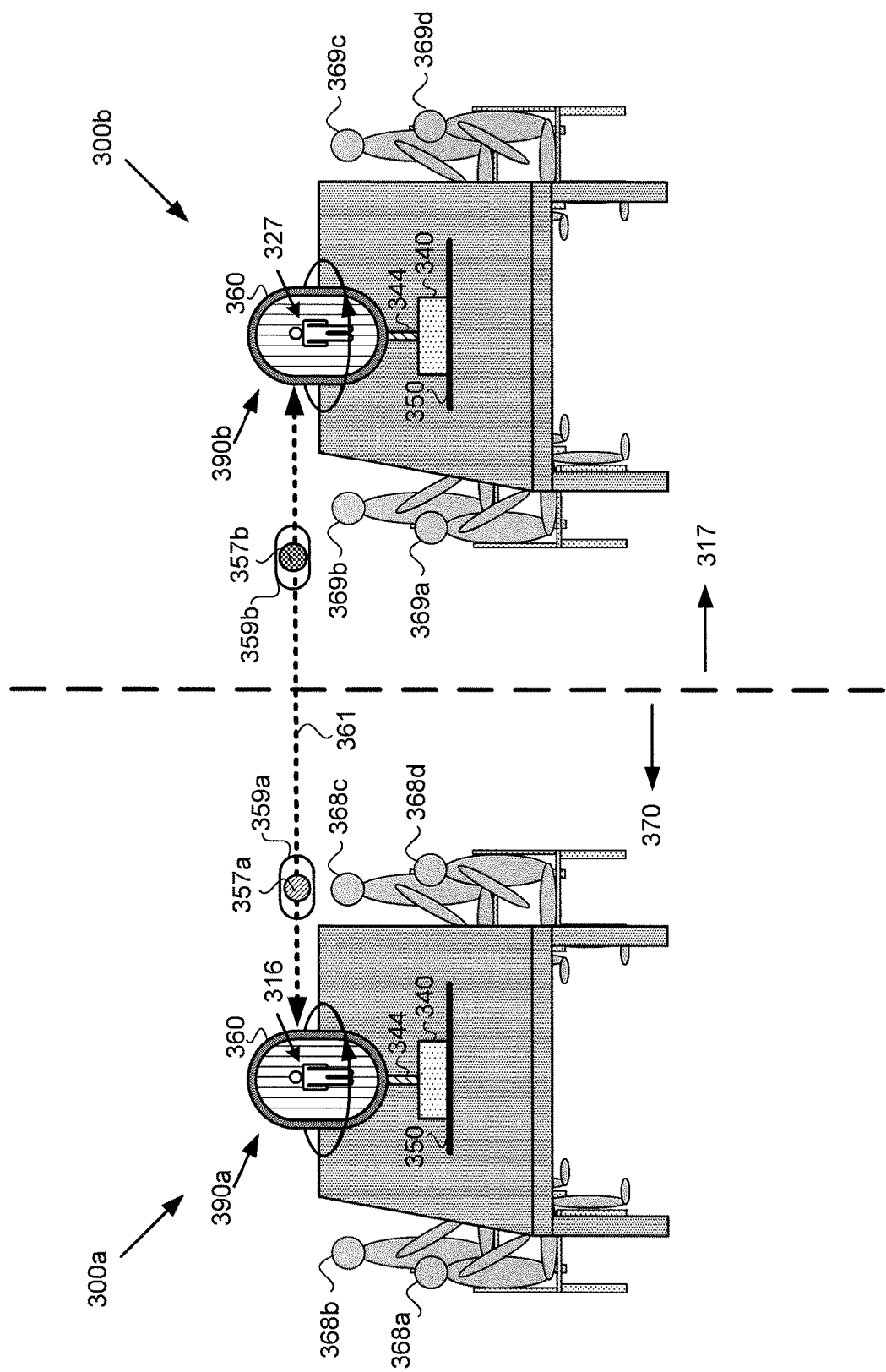
FIG. 3 shows an exemplary use case for the communication systems of FIGS. 1, 2A, and 2B.

FIG. 3 shows an exemplary use case for the communication systems of FIGS. 1, 2A, and 2B, according to one implementation. FIG. 3 shows communication system 300a implemented in local venue 370 utilized by local users 368a, 368b, 368c, and 368d, as well as remote communication system 300b implemented in remote venue 317 utilized by remote users 369a, 369b, 369c, and 369d. It is noted that local venue 370 corresponds in general to the venue local to communication systems 100/200A/200B and described above, while remote venue 317 corresponds in general to remote venue 117/217 in FIGS. 1A, 2A, and 2B. Moreover, local users 368a and 368b correspond in general to local users 168a and 168b, in FIG. 1A.

As shown in FIG. 3, communication system 300a includes base 340 and display 390a providing display screen 360. Base 340 is shown to be situated on surface 350, which may be a floor or any other substantially horizontal surface. As further shown in FIG. 3, communication system 300a includes rotor 344 coupling base 340 to display 390a. In addition, FIG. 3 shows floating image 316 of remote venue 117/217/317, generated by communication system 300a. Also shown in FIG. 3 are display 390b of remote communication system 300b, audio-visual data 359b including image data 357b corresponding to remote venue 117/217/317, local audio-visual data 359a including local image data 357a of local venue 370, and wireless communication link 361 between communication system 300a and remote communication system 300b.

Communication system 300a corresponds in general to communication system 100/200A/200B, in FIGS. 1A, 2A, and 2B. As a result, communication system 300a may share any of the characteristics attributed to communication system 100/200A/200B by the present disclosure, and vice versa. For example, like communication system 100/200A/200B, communication system 300a includes sensor network 120 bridging base 340 and display 390a. In addition, rotor 344 and base 340 correspond in general to rotor 144/244 and base 140/240 in FIGS. 1A, 2A, and 2B. Thus, rotor 344 and base 340 may share any of the characteristics attributed to rotor 144/244 and base 140/240 by the present disclosure, and vice versa. That is to say, although not explicitly shown in FIG. 3, base 340 includes features corresponding respectively to motor 142/242, motor controller circuit 148, and MCU 146.

Moreover, display 390a including display screen 360 corresponds in general to display 190/290A/290B including display screen(s) 160/260/260a/260b, in FIGS. 1A, 2A, and 2B. Thus, display 390a may share any of the characteristics attributed to display 190/290A/290B by the present disclosure, and vice versa. In other words, although not explicitly shown in FIG. 3, display 390a includes features corresponding respectively to computing platform 102 including transceiver 104, ASIC 110 having CPU 112, GPU 114, and DSP 116, and system memory 106 storing software code 108. In addition, computing platform 102 of display 300a may be communicatively coupled to one or more of projection system 164, audio system 166, 360° degree camera 118, and laser 119. Furthermore, display 390a may include image capture device 258 mounted on display 390a and configured to rotate with display 390a.

It is noted that floating image 316 of remote venue 117/217/317 corresponds to floating image 116, in FIG. 1A, and those corresponding features may share any of the characteristics attributed to either of floating image 116 and floating image 316 by the present disclosure. It is further noted that, in some implementations, remote communication system 300b may correspond to communication system 100/200A/200B/300a and may share any of the characteristics attributed to that corresponding system by the present disclosure. However, in some implementations, remote communication system 300b may omit one or more of the features attributed to communication system 100/200A/200B/300a. For example, in some implementations, remote communication system 300b may omit base 140/240/340 and rotor 144/244/344. In those implementations, display 390b of remote communication system 300b may be a stationary display, not configured to rotate, and including a substantially flat or half cylindrical display screen, for example.

Each of local venue 370 and remote venue 117/217/317 may correspond to a video conferencing venue in an office complex, hospital, university, or hotel business center, for example. In implementations in which local venue 370 and remote venue 117/217/317 are video conferencing venues, for example, local users 168a/368a, 168b/368b, 368c, and 368d may correspond to local participants in a video conference, while remote users 369a, 369b, 369c, and 369d may correspond to remote participants in the video conference.

According to the exemplary implementation shown in FIG. 3, remote image data 357b of remote venue 117/217/317 including remote users 369a, 369b, 369c, and 369d, as well as remote audio data generated at remote venue 117/217/317, may be received by communication system 300a at local video conferencing venue 370 as audio-visual data 359b via wireless communication link 361. The audio data included in audio-visual content 359b may be broadcast to local users 168a/368a, 168b/368b, 368c, and 368d by audio system 166, while image data 357b corresponding to remote venue 117/217/317 is rendered on display screen 360 of communication system 300a. As a result, and due to spinning of rotor 144/244/344 and display 190/290A/290B/390a of communication system 100/200A/200B/300a, as described above, floating image 116/316 of remote venue 117/217/317 may appear to local users 168a/368a, 168b/368b, 368c, and 368d as 3D interactive floating image 116/316 of remote venue 117/217/317 including remote users 369a, 369b, 369c, and 369d.

Substantially concurrently with spinning of display 390a to generate floating image 116/316, local image data 357a of local venue 370 including local users 168a/368a, 168b/368b, 368c, and 368d may be obtained by communication system 300a using one or more of camera(s) 138b, 360° camera 118, laser 119 and laser sensor 122f, and image capture device 258. Local image data 357a, along with local audio data obtained using microphone(s) 124, for example, may be transmitted to remote communication system 300b to at remote video conferencing venue 117/217/317 as local audio-visual data 359a via wireless communication link 361.

By way of example, communication system 100/200A/200B/300a and remote communication system 300b can be used for video conferencing in a number of different exemplary implementations. For example, in one implementation, an image feed captured from remote communication system 300b can be translated into a 1:1 recreation or mirror image that is displayed in local venue 370 by communication system 100/200A/200B/300a. For instance, the position of a camera view on remote communication system 300b can be mapped to the opposite side on communication system 100/200A/200B/300a. In this way, display 190/290A/290B/390a of communication system 100/200A/200B/300a would act as a cylindrical window where local users 168a/368a, 368b/368b, 368c, and 368d can walk around display 190/290A/290B/390a to observe remote venue 117/217/317 from different angles.

Alternatively, in one implementation, each of local users 168a/368a, 368b/368b, 368c, and 368d could view remote venue 117/217/317 from a perspective substantially matching their individual locations within local venue 370, reduced in size to fit display screen 160/260/260a/260b/360.

In implementations in which remote display 390b includes a traditional flat screen as display screen 360, a distorted fish eye view of local image data 357 may be rendered on display 390b. In those implementations, remote users 369a, 369b, 369c, and 369d would see an expanded/ warped view of local venue 370 generated from a set of images obtained and transmitted by communication system 100/200A/200B/300a. Other implementations can include additional functionality using different forms of tracking. For example, facial tracking and voice tracking can be used to direct attention to a specific person in the venue, whether local or remote, (e.g. the person presently speaking during the video conference).

Figure 4:
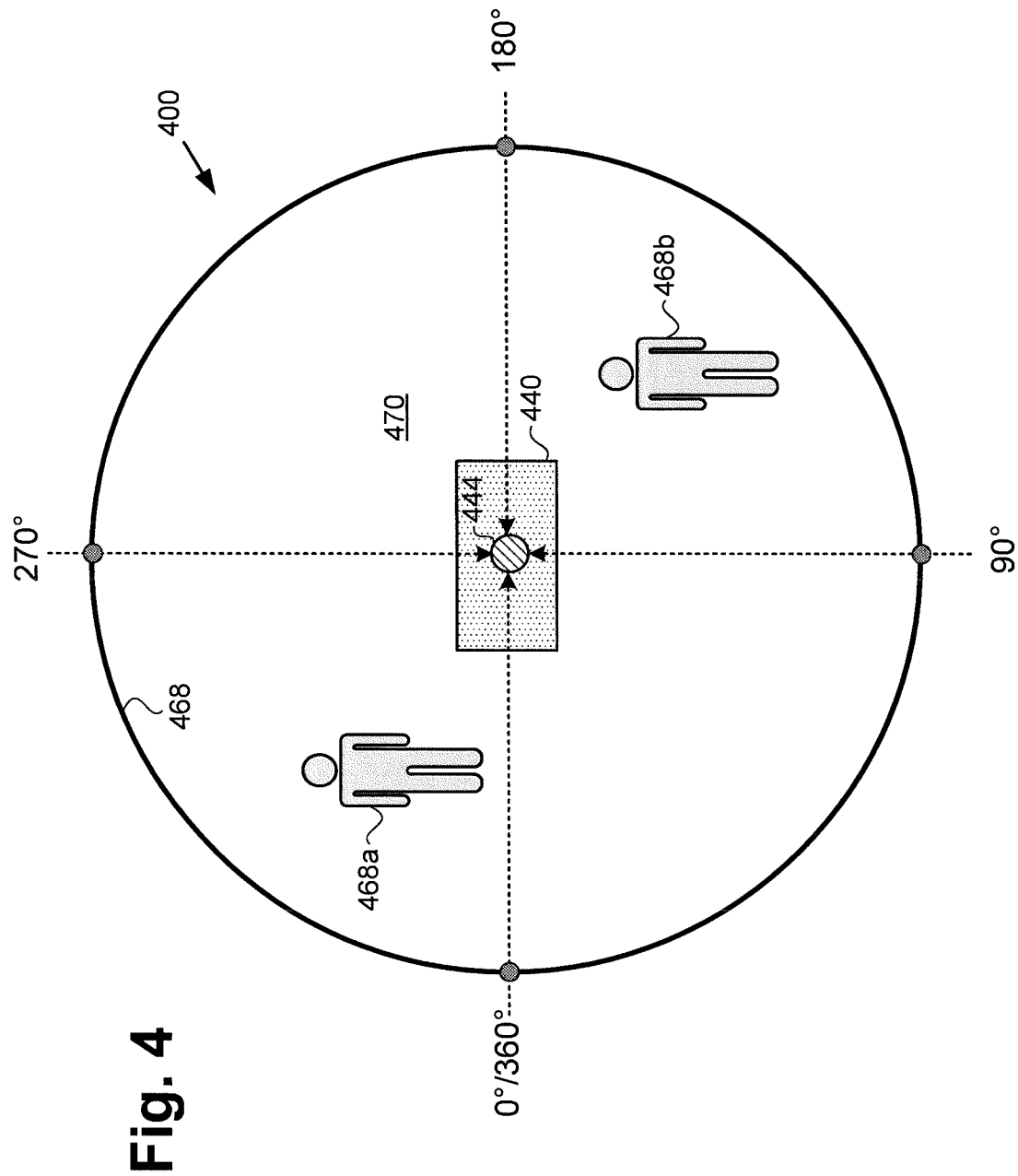
FIG. 4 shows a diagram of another exemplary implementation of a communication system for generating a floating image of a remote venue.

FIG. 4 shows a top view of another exemplary implementation of a communication system for generating a floating image of a remote venue, from a perspective corresponding to perspective lines 4-4 in FIG. 2A. FIG. 4 shows base 440, rotor 444, and panoramic display screen 468 of communication system 400. Also shown in FIG. 4 are local users 468a and 468b and local venue 470. Communication system 400 corresponds in general to communication system 100/200A/200B/300a in FIGS. 1A, 2A, 2B, and 3, and may share any of the characteristics attributed to those corresponding systems above. It is noted that other features of communication system 400, such as features corresponding respectively to display 190/290A/290B/390a, motor 142/242, motor controller circuit 148 including MCU 146, sensor network 120/220, computing platform 102, 360° camera 118, laser 119, projection system 164, and audio system 166 are not shown in FIG. 4 in the interests of conceptual clarity.

Base 440 and rotor 444 correspond in general to base 140/240/340 and rotor 144/244/344 may share any of the characteristics attributed to those corresponding features above. In addition, local users 468a and 468b correspond respectively to local users 168a/368a and 168b/368b in FIGS. 1A and 3, while local venue 470 corresponds to local venue 370, in FIG. 3. It is noted that although panoramic display screen 468 is shown as a cylindrical display screen surrounding local users 168a/368a/468a and 168b/368b/468b, that representation is merely exemplary. In other implementations, panoramic display screen 468 may assume any shape and dimensions suitable for rendering a panoramic image of remote venue 117/217/317.

According to the exemplary implementation shown in FIG. 4, image data 357b in the form of 360° image data is received by communication system 100/200A/200B/300a/400 from remote communication system 300b. That 360° image data may be rendered on panoramic display screen 468 around local users 168a/368a/468a and 468b/368b/468b using projection system 164. As a result, substantially the entirety of remote venue 117/217/317 may be displayed to local users 168a/368a/468a and 468b/368b/468b at once. Alternatively, a set of live images included in image data 357b may be stitched together to form a 360° image and may be updated in real-time, thereby enabling local users 168a/368a/468a and 468b/368b/468b to scroll or rotate through camera views to look around remote venue 117/217/317.

Figure 5:
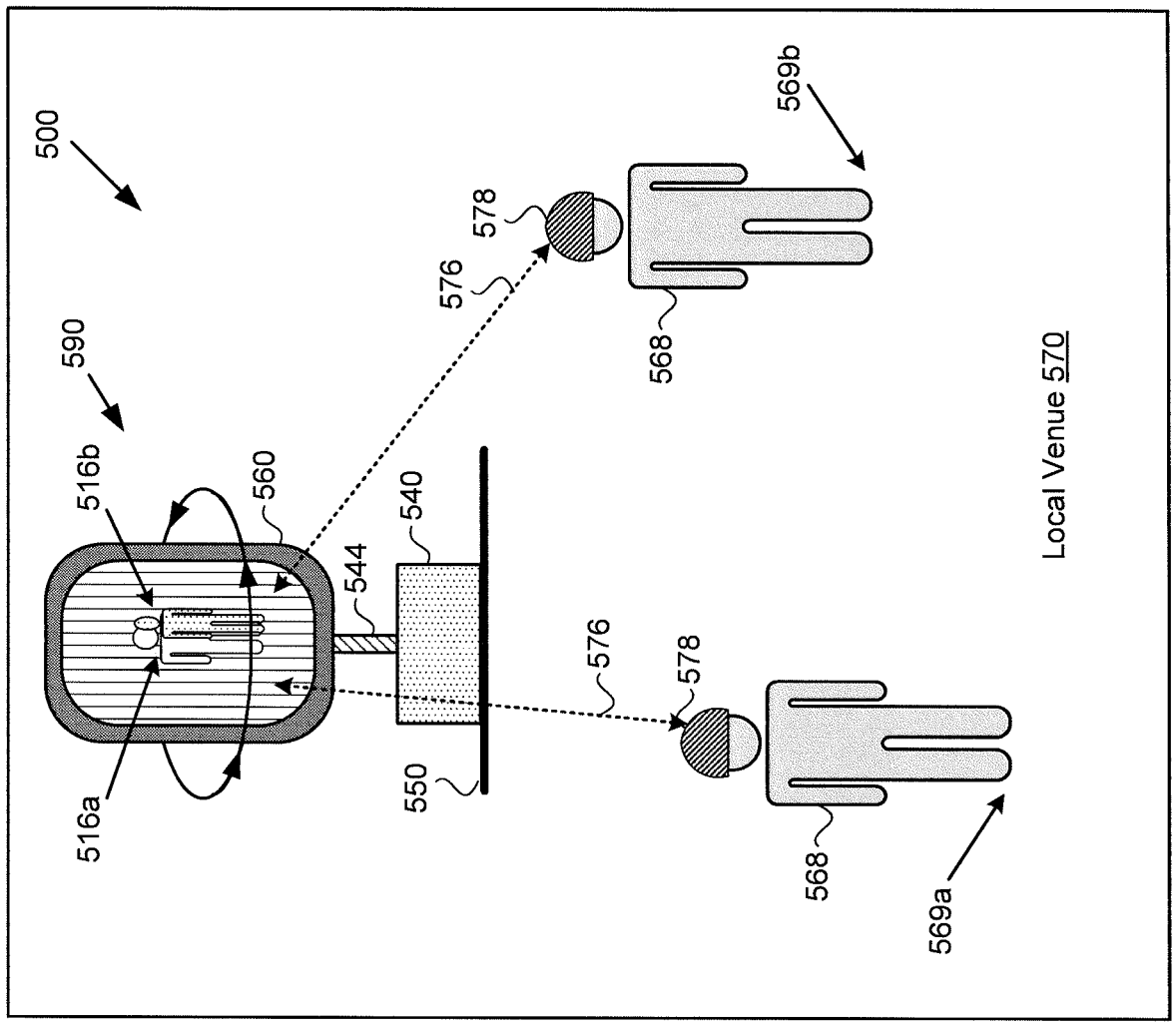
FIG. 5 shows a diagram of another exemplary implementation of a communication system for generating a floating image of a remote venue.

FIG. 5 shows a diagram of exemplary communication system 500 for generating a floating image of a remote venue, according to another implementation. As shown in FIG. 5, communication system 500 includes base 540 and display 590. Base 540 is shown to be situated on surface 550, which may be a floor or any other substantially horizontal surface, and to include display screen 560. In addition, according to the exemplary implementation shown in FIG. 5, communication system 500 includes rotor 544 coupling base 540 to display 590.

FIG. 5 further shows first and second floating image perspectives 516a and 516b of remote venue 117/217/317. Also shown in FIG. 5 are local venue 570, locations 569a and 569b in local venue 570, local user 568, wearable floating image tracking sensor 578, and wireless communication link 576. It is noted that local user 468 corresponds to any of local users 168a/368a/468a, 168b/368b/468b, 368c, or 368d in FIGS. 1A, 3, and 4. It is further noted that local venue 570 corresponds to local venue 370/470 in FIGS. 3 and 4.

Communication system 500 corresponds in general to communication system 100/200A/200B/300a/400, in FIGS. 1A, 2A, 2B, 3, and 4. As a result, communication system 500 may share any of the characteristics attributed to communication system 100/200A/200B/300a/400 by the present disclosure, and vice versa. For example, like communication system 100, communication system 500 includes sensor network 120 bridging base 540 and display 590. In addition, rotor 544 and base 540 correspond respectively in general to rotor 144/244/344/444 and base 140/240/340/440, in FIGS. 1A, 2A, 2B, 3, and 4. Thus, rotor 544 and base 540, may share any of the characteristics attributed to rotor 144/244/344/444 and base 140/240/340/440 by the present disclosure, and vice versa. That is to say, although not explicitly shown in FIG. 5, base 540 includes features corresponding respectively to motor 142/242, motor controller circuit 148, and MCU 146.

Moreover, display 590 including display screen 560 corresponds in general to display 190/290A/290B/390a including display screen 160/260/260a/260b/360, in FIGS. 1A, 2A, 2B, and 3. Thus, display 590 may share any of the characteristics attributed to display 190/290A/290B/390a by the present disclosure, and vice versa. In other words, although not explicitly shown in FIG. 5, display 590 includes features corresponding respectively to computing platform 102 including transceiver 104, ASIC 110 having CPU 112, GPU 114, and DSP 116, and system memory 106 storing software code 108. In addition, computing platform 102 of display 590 may be communicatively coupled to one or more of projection system 164, audio system 166, 360° degree camera 118, and laser 119. Furthermore, like display 100/290A/290B/390a, display 590 may include image capture device 258 mounted on display 590 and configured to rotate with display 590.

Wearable floating image tracking sensor 578 may be implemented as an augmented reality (AR) or virtual reality (VR) viewing device, for example, worn by local user 568 as a head-mounted tracking sensor. Wearable floating image tracking sensor 578 is in communication with computing platform 102 of communication system 100/200A/200B/300a/400/500, through integrated sensor system 120 or transceiver 104, for example, and via wireless communication link 576. As local user 568 moves within local venue 370/470/570, for example from location 569a to location 569b, wearable floating image tracking sensor 578 enables the generation of perspectives of floating image 116/316 of remote venue 117/217/317 appropriate respectively to locations 569a and 569b in local venue 370/470/570 relative to floating image 116/316.

For example, wearable floating image tracking sensor 578 enables local user 568 to view floating image 116/316 of remote venue 117/217/317 from first floating image perspective 516a when local user 568 is at location 569a, and to advantageously view floating image 116/316 of remote venue 117/217/317 from location appropriate second floating image perspective 516b when local user is at location 569b. Moreover, in some implementations, local user 568 can utilize wearable floating image tracking sensor 578 to look around remote venue 117/217/317 as if they are standing where remote communication system 300b is located in remote venue 117/217/317.

Figure 6:
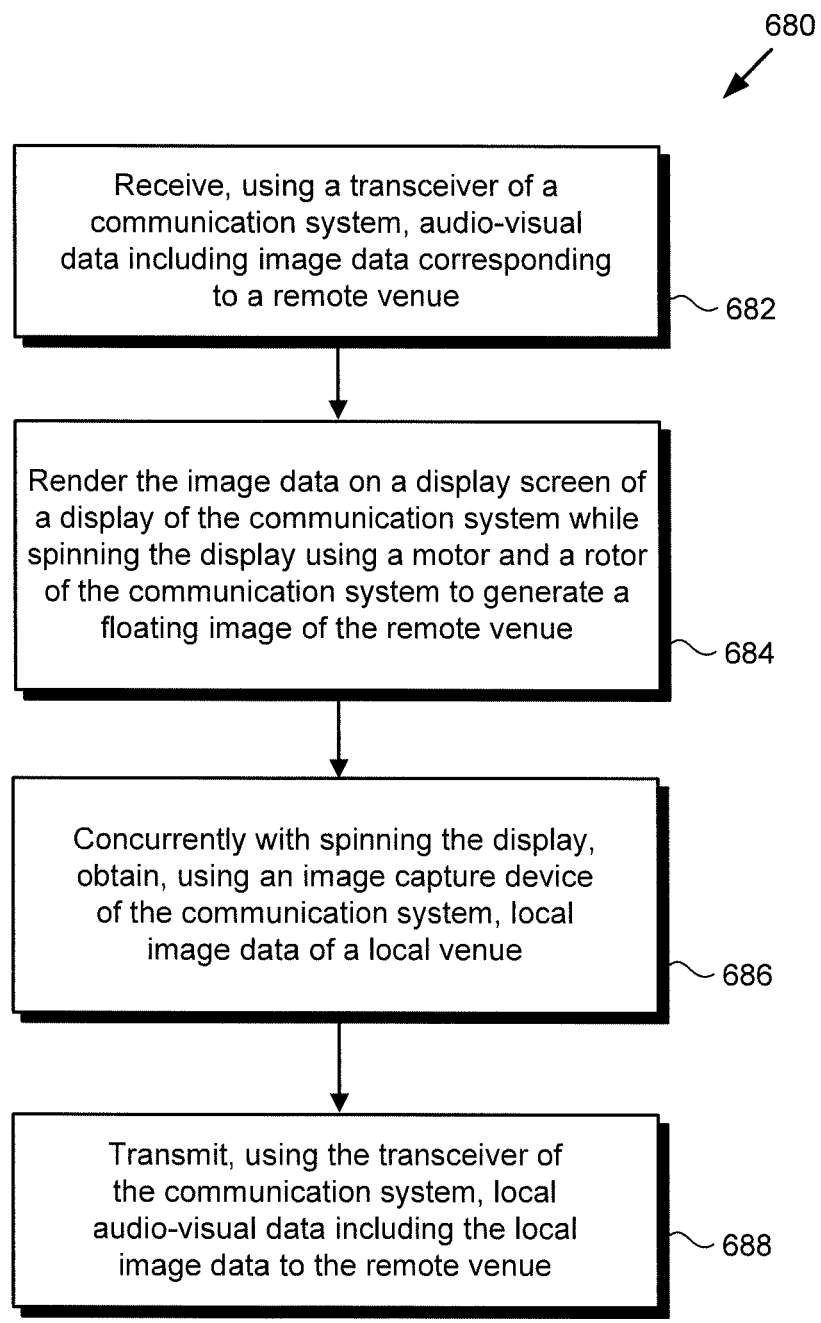
FIG. 6 shows a flowchart outlining an exemplary method for use by a communication system for generating a floating image of a remote venue, according to one implementation.

The functionality of communication system 100/200A/200B/300a/400/500 will be further described by reference to FIG. 6. FIG. 6 shows flowchart 680 of an exemplary method for use by a communication system for generating a floating image of a remote venue, according to one implementation. With respect to the method outlined in FIG. 6, it is noted that certain details and features have been left out of flowchart 680 in order not to obscure the discussion of the inventive features in the present application.

Referring to FIG. 6 in combination with FIGS. 1A, 2A, 2B, 3, 4, and 5, flowchart 680 begins with receiving, using transceiver 104 of communication system is 100/200A/200B/300a/400/500, audio-visual data 359b including image data 357b corresponding to remote venue 117/217/317 (action 682). Audio visual data 359b including image data 357b may be received by software code 108, executed on communication system 100/200A/200B/300a/400/500 by CPU 112 of ASIC 110, and using transceiver 104.

Flowchart 680 continues with rendering image data 357b on display screen 160/260/260a/260b/360/560 of communication system 100/200A/200B/300a/400/500 while spinning display 190/290A/290B/390a/590 using motor 142/242 and rotor 144/244/344/444/544 to generate floating image 116/316 of remote venue 117/217/317 (action 684). Rendering of image data 357b on display screen 160/260/260a/260b/360/560 of communication system 100/200A/200B/300a/400/500 while spinning display 190/290A/290B/390a/590 to generate floating image 116/316 of remote venue 117/217/317 may be performed by software code 108, executed by CPU 112 of ASIC 110, and, according to some implementations, using GPU 114 of ASIC 110.

CPU 112 of ASIC 110 may be configured to execute software code 108 to control motor 142/242 to spin rotor 144/244/344/444/544 and display 190/290A/290B/390a/590 about vertical axis 154/254 at a variable spin rate, or at a predetermined substantially constant spin rate, which may be on the order of approximately one or more tens or hundreds of rotations per second, for example.

According to various implementations of the present inventive concepts, the spin rate of rotor 144/244/344/444/544 and display 190/290A/290B/390a/590 may depend in part on the frame rate of display 190/290A/290B/390a/590. As known in the art, the term "frame rate" refers to the rate or frequency with which a new frame can be rendered on a display, expressed in frames per second (fps). Thus, frame rate is to be distinguished from refresh rate, which is the rate or frequency with which the same frame can be redrawn on a display. In addition to the frame rate of display 190/290A/290B/390a/590, the spin rate with which rotor 144/244/344/444/544 and display 190/290A/290B/390a/590 spin or rotate may be based on the number of perspectives of floating image 116/316 of remote venue 117/217/317 being displayed by communication system 100/200A/200B/300a/400/500.

Flowchart 680 continues with, concurrently with spinning display 190/290A/290B/390a/590, using one or more of 360° camera 118, laser 119 and laser sensor 122f, camera(s) 138b, and image capture device 258 to obtain local image data 357a of local venue 370/470/570 (action 686). It is noted that, as used in the present application, the expression "image capture device" may refer to any or all of the features disclosed herein as 360° camera 118, laser 119 and laser sensor 122f, camera(s) 138b, and image capture device 258. Moreover, and as discussed above, image capture device 258 includes image sensor configured to rotate with display 190/290A/290B/390a/590. For example, image capture device 258 may include a vertical array of image sensors, such as a vertical array of approximately 1,024 or 2,048 sensors, for example, mounted on display 190/290A/290B/390a/590.

It is noted that in implementations in which local image data is obtained using 360° camera 118, local image data 357a includes 360° image data of local venue 370/470/570. Obtaining local image data 357a of local venue 370/470/570 concurrently with spinning display 190/290A/290B/390a/590 may be performed by software code 108, executed by CPU 112 of ASIC 110, and, according to some implementations, using GPU 114 of ASIC 110.

Flowchart 680 can conclude with transmitting, using transceiver 104 of communication system 100/200A/200B/300a/400/500, local audio-visual data 359a including local image data 357a to remote venue 117/217/317 (action 688). Local audio visual data 359a including local image data 357a may be transmitted to remote communication system 300b of remote venue 117/217/317 via wireless communication link 361, for example, by software code 108, executed on communication system 100/200A/200B/300a/400/500 by CPU 112 of ASIC 110, and using transceiver 104.

Thus, the present application discloses communication systems and methods for generating a floating image of a remote venue. By spinning a display upon which a 2D image of a remote venue is rendered, the present communication solution is capable of generating an apparently floating image of the remote venue that may appear to be realistically 3D. In addition, by using an image capture device to obtain local image data of a local venue concurrently with spinning of the display, the present communication solution generates data that can be transmitted to the remote venue in real-time. As a result, the present communication solution advantageously enables realistic, engaging, and immersive group interactions among group participants who are physically remote from one another.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A communication system comprising:
   a computing platform including at least one hardware processor and a system memory storing a software code;
   a plurality of image capture devices, a transceiver, and a display including a display screen, controlled by the at least one hardware processor;

a base including a motor coupled to a rotor for rotating the display;

the at least one hardware processor configured to execute the software code to:

receive, using the transceiver, an audio-visual data including a 360 degree remote image data corresponding to a remote venue;

determine a location of each of a plurality of local viewers in a local venue;

generate multiple two-dimensional (2D) images each depicting a perspective of the 360 degree remote image data that is appropriate to a respective one of the locations of each of the plurality of local viewers;

render on the display screen, the multiple 2D images of the 360 degree remote image data, while spinning the display using the motor and the rotor to generate a floating image of the remote venue;

concurrently with spinning the display, obtain, using the plurality of image capture devices, a local image data of the local venue, wherein the plurality of image capture devices comprise a plurality of image sensors configured to spin with the display; and transmit, using the transceiver, a local audio-visual data including the local image data to the remote venue.

2. The communication system of claim 1, wherein the floating image of the remote venue appears to be a three-dimensional (3D) floating image of the remote venue.

3. The communication system of claim 1, wherein the local image data comprises 360° local image data of the local venue.

4. The communication system of claim 1, wherein the plurality of image capture devices further comprise a 360° camera.

5. The communication system of claim 1, wherein the plurality of image capture devices further comprise a laser configured to spin with the display.

6. The communication system of claim 1, wherein the plurality of image sensors configured to spin with the display comprise a vertical array of image sensors mounted on the display.

7. The communication system of claim 1, wherein the computing platform and the display are provided by a mobile communication device configured to spin with the rotor, wherein the mobile communication device is one of a smartphone or a tablet computer.

8. A method for use by a communication system including a plurality of image capture devices, a transceiver, a display having a display screen, a base including a motor coupled to a rotor for rotating the display, and a computing platform having at least one hardware processor and a system memory storing a software code, the method comprising:

receiving, using the transceiver controlled by the at least one hardware processor, an audio-visual data including a 360 degree remote image data corresponding to a remote venue;

determining, using the at least one hardware processor, a location of each of a plurality of local viewers in a local venue;

generating multiple two-dimensional (2D) images each depicting a perspectives of the 360 degree remote image data that is appropriate to a respective one of the locations of each of the plurality of local viewers;

rendering, on the display screen using the at least one hardware processor, the multiple 2D images of the 360 degree remote image data, while spinning the display using the motor and the rotor to generate a floating image of the remote venue;

concurrently with spinning the display, obtaining, using the plurality of image capture devices controlled by the at least one hardware processor, a local image data of the local venue, wherein the plurality of image capture devices comprise a plurality of image sensors configured to spin with the display; and transmitting, using the transceiver controlled by the at least one hardware processor, a local audio-visual data including the local image data to the remote venue.

9. The method of claim 8, wherein the floating image of the remote venue appears to be a three-dimensional (3D) floating image of the remote venue.

10. The method of claim 8, wherein obtaining the local image data comprises obtaining 360° local image data of the local venue.

11. The method of claim 8, wherein the plurality of image capture devices further comprise a 360° camera.

12. The method of claim 8, wherein the plurality of image capture devices further comprise a laser configured to spin with the display.

13. The method of claim 8, wherein the plurality of image sensors configured to spin with the display comprise a vertical array of image sensors mounted on the display.

14. The method of claim 8, wherein the computing platform and the display are provided by a mobile communication device configured to spin with the rotor, wherein the mobile communication device is one of a smartphone or a tablet computer.

15. A communication system comprising:

a computing platform including at least one hardware processor and a system memory storing a software code;

a transceiver, and a display including a first display screen, controlled by the at least one hardware processor;

a base including a motor coupled to a rotor for rotating the display;

the at least one hardware processor configured to execute the software code to:

receive, using the transceiver, an audio-visual data including a 360 degree remote image data corresponding to a remote venue;

determine a local location of each of a plurality of local viewers in a local venue;

generate multiple two-dimensional (2D) images each depicting a perspective of the 360 degree remote image data corresponding to each of remote locations in the remote venue;

render, using the display screen, the multiple 2D images of the 360 degree remote image data, while spinning the display using the motor and the rotor to generate a floating image of the remote venue, wherein rendering renders a different one of the multiple 2D images for each of the plurality of local viewers based on its local location matching one of the remote locations having the corresponding perspective of the 360 degree remote image data in the remote venue.

16. The communication system of claim 15, wherein the floating image of the remote venue appears to be a three-dimensional (3D) floating image of the remote venue.

17. The communication system of claim 15, further comprising:

an image capture device, wherein the at least one hardware processor is further configured to execute the software code to:

concurrently with spinning the display, obtain, using the image capture device, a local image data of the local venue; and transmit, using the transceiver, a local audio-visual data including the local image data to the remote venue;

wherein the local image data comprises 360° local image data of the local venue.

18. The communication system of claim 17, wherein the image capture device comprises a 360° camera.

19. The communication system of claim 17, wherein the image capture device comprises at least one image sensor configured to rotate with the display.

20. The communication system of claim 17, wherein the image capture device comprises a vertical array of image sensors mounted on the display.

* * * * *